United States Patent
Kühner et al.

(10) Patent No.: US 8,211,995 B2
(45) Date of Patent: Jul. 3, 2012

(54) METHOD FOR THE REMOVAL OF ALKALINE OR ACIDIC COMPOUNDS FROM A SOLVENT-CONTAINING METAL OXIDE DISPERSION, IN PARTICULAR SILICIC ACID

(75) Inventors: Uwe Dietrich Kühner, Hamburg (DE); Onno Graalmann, Geesthacht (DE)

(73) Assignee: Nanoresins AG, Geesthacht (DE)

( * ) Notice: Subject to any disclaimer, the term of this patent is extended or adjusted under 35 U.S.C. 154(b) by 189 days.

(21) Appl. No.: 12/671,190

(22) PCT Filed: Jun. 2, 2008

(86) PCT No.: PCT/EP2008/004379
§ 371 (c)(1),
(2), (4) Date: Jan. 28, 2010

(87) PCT Pub. No.: WO2009/015717
PCT Pub. Date: Feb. 5, 2009

(65) Prior Publication Data
US 2010/0197854 A1 Aug. 5, 2010

(30) Foreign Application Priority Data
Jul. 30, 2007 (EP) .................................... 07014927

(51) Int. Cl.
*B01D 5/00* (2006.01)
*C08K 3/22* (2006.01)

(52) U.S. Cl. ........ 528/271; 524/560; 524/612; 106/436; 106/482

(58) Field of Classification Search .................. 528/271; 524/560, 612; 106/436, 482
See application file for complete search history.

(56) References Cited

U.S. PATENT DOCUMENTS

| | | | |
|---|---|---|---|
| 3,772,403 A * | 11/1973 | Wells | 524/245 |
| 4,139,420 A | 2/1979 | Stunkel | |
| 5,487,816 A | 1/1996 | Schulz et al. | |
| 6,384,125 B1 * | 5/2002 | Bergstrom et al. | 524/492 |
| 2002/0156152 A1 * | 10/2002 | Zhang et al. | 523/115 |
| 2005/0020699 A1 | 1/2005 | Isobe et al. | |

FOREIGN PATENT DOCUMENTS

| | | |
|---|---|---|
| EP | 0401631 | 12/1990 |
| WO | WO01/52618 | 7/2001 |

* cited by examiner

*Primary Examiner* — David W Wu
*Assistant Examiner* — Chun-Cheng Wang
(74) *Attorney, Agent, or Firm* — Casimir Jones, S.C.

(57) ABSTRACT

The subject matter of the invention is a method for the removal of alkaline or acidic compounds from a solvent-containing metal oxide dispersion, having the following steps: a. conversion of the solvent into gas phase; b. condensation of the solvent; c. bringing the condensed solvent into contact with a neutralizing agent; d. Return of the condensed solvent into the metal oxide dispersion.

14 Claims, No Drawings

METHOD FOR THE REMOVAL OF ALKALINE OR ACIDIC COMPOUNDS FROM A SOLVENT-CONTAINING METAL OXIDE DISPERSION, IN PARTICULAR SILICIC ACID

This application is a §371 US National Entry of International Application No. PCT/EP2008/004379, filed Jun. 2, 2008, which claims the benefit of European Application No. 07014927.3, filed Jul. 30, 2007, each of which is incorporated herein by reference in its entirety.

The invention relates to a process for the removal of basic or acidic compounds from a solvent-containing metal oxide dispersion.

Metal oxide particles, for example silicon dioxide particles, in particular nanoscale silicon dioxide particles, are used as fillers in various polymer materials with the aim of improving their mechanical properties. By way of example, it is known that a silica solution can be acidified to produce what is known as a silica sol, which comprises colloidally dispersed nanoscale silicon dioxide particles in solution.

It is known that the surface of silicon dioxide particles can be modified to facilitate their binding into a polymer matrix. By way of example, a surface silanization process can be carried out. Examples of reagents that can be used to carry out the surface silanization process are halosilanes. This reaction liberates the corresponding hydrogen halides or hydrohalic acids, and these can have a disadvantageous effect on the properties of a polymer produced with the silanized filler, and/or can have a corrosive effect on packaging and plant.

An object on which the invention is based is to provide an advantageous possibility for the removal of acidic and/or basic compounds from metal oxide dispersions, in particular nanoscale silicon dioxide dispersions.

The process of the invention has the following steps:
a. conversion of solvent to the gas phase;
b. allowing the solvent to condense;
c. bringing the condensed solvent into contact with a neutralization medium;
d. returning the condensed solvent to the metal oxide dispersion.

First, some terms used for the purposes of the invention will be explained.

The term solvent-containing metal oxide dispersion describes dispersions of metal oxide particles, in particular nanoscale metal oxide particles, in a solvent. For the purposes of the invention, the term metal oxide also encompasses silicon dioxide.

The solvent-containing silica sol preferred in the invention is a dispersion of silicon dioxide particles, in particular nanoscale silicon dioxide particles, in a solvent. By way of example, these can be silica sols synthesized by acidification of silica solutions, but the term is not restricted to that synthetic method.

For the purposes of the invention, basic or acidic compounds are preferably compounds which can be removed by entrainment with the solvent, examples being volatile compounds or compounds which, together with the solvent, by way of example form an azeotrope, or are removed by entrainment in some other way.

For the purposes of the invention, the solvent of the dispersion or a portion thereof is first converted to the gas phase. This can be achieved by way of example by heating at atmospheric pressure or at reduced pressure.

This gas phase is then recondensed, and the condensed solvent is brought into contact with a neutralization medium. The condensed and neutralized solvent is then returned to the metal oxide dispersion. The process of the invention can be carried out in particular by heating at reflux, where the reflux takes place by way of the neutralization medium.

The neutralization medium has spatial separation from the metal oxide dispersion in the present invention. Since only the returning solvent comes into contact therewith, it is not possible for the neutralization medium to contaminate the actual metal oxide particles, in particular silicon dioxide particles. The spatial separation of dispersion and neutralization medium has advantages in terms of production technology since this separation facilitates continuous conduct of the neutralization process. By way of example, the neutralization medium can be refreshed or renewed in a continuous process, whereas this is not possible when direct batchwise neutralization of the dispersion is used.

The invention takes account of the fact that the known direct method of silica-sol neutralization disclosed by way of example in U.S. Pat. No. 6,384,125 B1 is disadvantageous. In this direct neutralization method, the silicon dioxide particles come into contact with the neutralization medium, with the resultant possibility that their properties will be altered. Even small amounts of ions from the neutralization medium can have an adverse effect on the properties of the particles. Furthermore, said prior art then requires that the silica sol be isolated from the neutralization medium.

The invention also takes account of the fact that, surprisingly, the solvent provides an adequate extent of removal of the volatile acids or bases by entrainment from the metal oxide dispersion (e.g. the silica sol), thus rendering them accessible to neutralization by the neutralization medium. The effect of conversion of the solvent to the gas phase and subsequent condensation is that the material removed by entrainment and coming into contact with the neutralization medium is exclusively solvent with the acids or bases, whereas the metal oxide particles remain in the liquid phase (the bottom product from the distillation process), thus being kept away from the neutralization medium.

The solvent used can comprise water or an organic solvent. Suitable organic solvents can be polar or nonpolar. Polarity determined empirically and expressed in units on what is known as the $E_T$ (30) scale rises by way of example from n-hexane, which is nonpolar, by way of toluene, chloroform, butanols, acetone, and ethanol, through to formamide. Examples that may be mentioned of organic solvents are alcohols (methanol, ethanol, propanols, butanols, octanols, cyclohexanol), glycols (ethylene glycol, diethylene glycol), ethers and glycol ethers (diethyl ether, dibutyl ether, anisole, dioxane, tetrahydrofuran, mono-, di-, tri-, and polyethylene glycol ethers), ketones (acetone, butanone, cyclohexanone), esters (acetates, glycol esters), amides and other nitrogen compounds (dimethylformamide, piperidine, N-methylpiperidone, acetonitrile), sulfur compounds (dimethyl sulfoxide), nitro compounds (nitrobenzene), halogenated hydrocarbons (dichloromethane, chloroform, tetrachloromethane, tri- and tetrachloroethane, 1,2-dichloroethane, chlorofluorocarbons), hydrocarbons (gasolines, petroleum ethers, cyclohexane, methylcyclohexane, decalin, terpenes, benzene, toluene, xylenes), and the like. Mixtures of these or other solvents can likewise be used. The solvent can be an organic solvent immiscible with water. In this context, immiscible with water means that the solvent can be brought into contact with an aqueous neutralization medium during the reflux procedure without any significant introduction of said aqueous neutralization medium into the metal oxide dispersion with the returning solvent.

For the purposes of the invention, the neutralization medium can be a solid, for example a suitable salt or an ion exchanger. A liquid can also be involved, preferably one with which the solvent is immiscible.

The process of the invention therefore permits neutralization of metal oxide particles, e.g. silicon dioxide particles, dispersed in solvent, without any alteration of the particles (in particular attachment of ions at the surface of the particles) caused by exposure to the neutralization medium. A silica sol neutralized in the invention can by way of example be used to produce nanoparticle powders which can be redispersed very easily in solvents. Compatibility with respect to nonpolar substrates (in particular nonpolar polymer matrices) is moreover retained, and there is an increase in the stability of the nanocomposites produced from the silicon dioxide particles.

For the purposes of the invention, preference is given to metal oxides of the third and fourth main group of the Periodic Table of the Elements, and to transition metal oxides, and also to oxides of the lanthanoids and of the actinoids. Preference is further given to $SiO_2$, $TiO_2$, and $ZnO_2$.

The metal oxide dispersion is preferably a colloidal dispersion. The metal oxide particles therefore substantially take the form of individual particles rather than aggregated and/or agglomerated particles.

The solvent can by way of example be an ester. Acids and bases catalyze the hydrolytic cleavage of esters. If the invention is to store a metal oxide dispersion in an ester for a relatively long period, the long-term stability of this type of dispersion is therefore substantially increased by using the entrainment process of the invention for prior removal of acids or bases.

The invention further provides the use of the following, produced in the invention: a solvent-containing metal oxide dispersion and, respectively, of a redispersible metal oxide powder that can be produced from this dispersion by removal of the solvent, in the production of a polymer material. Said polymer material can by way of example have been selected from the group consisting of polyesters, polyamides, polyimides, polycarbonate, and silicones.

Polycarbonates are thermoplastics in which even traces of bases bring about rapid degradation of the polymer under processing conditions with the resultant adverse effect on the properties of the material. Here, the invention can contribute to a substantial improvement in the properties of the material. Other materials that can react sensitively to acids or bases are polyesters, polyamides, polyimides, polyethers, polyether ketones, poly(meth)acrylates, and polysulfones.

When silicones are cured using platinum catalysts, small amounts of basic amines can act as catalyst poison. Acids, such as hydrochloric acid, cause equilibration of the silicone chains within a few days, at temperatures as low as 50° C. The result of this can be degradation of the crosslinked structure and reduced-length polymer chains. There can be an adverse effect on the mechanical properties of the material. In the case of uncrosslinked silicones, the polymer chains can react with the metal oxide filler, with resultant gelling of the materials.

A redispersible powder can be produced by removal of the solvent from a metal oxide dispersion produced in the invention. Because of the neutralization process carried out prior to removal of the solvent, said redispersible powder has a substantially nonpolar surface, and therefore has high compatibility with nonpolar organic media, e.g. monomers, oligomers, or prepolymers. This is particularly true for nonpolar dispersion media, such as silicones, hydrocarbons, polyolefins, nonpolar plasticizers, and the like. The high compatibility of the redispersible powder with said media leads to improved flow behavior (lower viscosity) and higher stability.

An example of the invention is described below.

INVENTIVE EXAMPLE 1

Production of a Silicon Dioxide Dispersion in Toluene.

63 g of chlorotrimethylsilane were used as initial charge in 1260 g of THF in a three-necked flask, and 1050 g of silica sol (Levasil 200/40%, BET=200 $m^2/g$, 40% of $SiO_2$, $Na^+$ removed by ion exchanger) were added dropwise by way of a dropping funnel, with vigorous stirring.

Within one hour, two phases had formed, and these were separated in a separating funnel. The lower phase comprised more than 99% of the solid, while the upper phase comprised most of the water. The lower phase was diluted with 140 g of THF and 63 g of chlorotrimethyl-silane were added to this, with stirring. After stirring for one hour, the material was transferred to a separating funnel.

Within one hour, two phases had again formed, and these were discharged separately. The upper phase was mainly composed of water and THF.

The lower phase was transferred to a three-necked flask and diluted with 400 g of toluene. A mixture of THF, water, and toluene was removed by distillation, with addition of further toluene. Toluene was added as necessary to avoid drying of the solution. Distillation was continued until the temperature was approximately the boiling point of toluene.

INVENTIVE EXAMPLE 2

Neutralization in the Invention

The toluene sol obtained in inventive example 1, still acidic, was heated at reflux. The solvent vapor here flowed by way of an inclined pipe laterally into a condenser. The droplets of condensed solvent flowed past the inclined tube and were conducted through a sodium-carbonate-packed column. The material flowed through a water separator and then passed back into the reaction vessel. After reflux for 6 hours, the sol was no longer acidic.

COMPARATIVE EXAMPLE 2

Not Inventive 30 g of sodium carbonate were added to the acidic toluene sol from inventive example 1, and the mixture was heated at reflux for 8 hours. It was then cooled, and the suspension was centrifuged using centrifugal acceleration of 4500 g. The material was then decanted from the sediment.

INVENTIVE EXAMPLE 3

Comparison of stability of composites filled with silicon dioxide particles.

Solids content was determined for the toluene sols from inventive example 2 and comparative example 2, with the aid of a volatility balance.

200 g of VS 65.000 polymer (vinyl-terminated polydimethylsiloxane, producer Hanse Chemie AG, viscosity 65 Pas (specified)) are used as initial charge in a 1 l flask with flat ground flange. The polydimethylsiloxane is diluted with 200 g of toluene, with stirring. An amount of toluene sol from inventive example 2 and, respectively, comparative example 2 is then added, with stirring, so that the ratio between the weight of solid from the toluene sol (silicon dioxide particles) to the weight of polydimethylsiloxane (VS 65.000) is 30:70. The mixture is then heated to 90° C. and the toluene is removed by distillation in vacuo.

The following measurements are made on the resultant, unhardened composites: viscosity (Brookfield RVDV-II+viscometer with spindle 42, 2.5 rpm), and storage stability at 50° C.

The viscosity of the composite from inventive example 2 is 207 Pas; that of comparative example 2 is higher: 245 Pas.

The composite from inventive example 2 is unaltered after 8 weeks of storage at 50° C. Comparative example 2 gels within a period of one week on storage at 50° C. and is therefore not storage-stable.

INVENTIVE EXAMPLE 4

100 g of Levasil 200/40% were deionized with acidic ion exchanger (Amberjet 1200 H, Rohm & Haas), and diluted with 200 g of isopropanol, and 9.0 g of hexamethyldisilazane were added thereto. The mixture was then stirred at 70° C. for 2 h. The sol was then heated at reflux in such a way that the solvent flowing back out of the condenser flows through a column packed with an acidic ion exchanger (Amberjet 1200 H Rohm & Haas). A moistened pH paper reacts neutrally with respect to the sol after 10 hours, indicating pH 7.

What is claimed is:

1. A process for the removal of basic or acidic compounds from a solvent-containing metal oxide dispersion, characterized by the following steps:
    a) conversion of solvent to the gas phase;
    b) allowing the solvent to condense;
    c) bringing the condensed solvent of b) into contact with a neutralization medium;
    d) returning the neutralized solvent of c) to the metal oxide dispersion.

2. The process as claimed in claim 1, wherein the solvent is an organic solvent.

3. The process as claimed in claim 2, wherein the solvent is an organic solvent immiscible with water.

4. The process as claimed in claim 1, wherein the solvent-containing metal oxide dispersion is heated at reflux.

5. The process as claimed in claim 1, wherein the neutralization medium is a solid.

6. The process as claimed in claim 5, wherein the neutralization medium comprises a salt.

7. The process as claimed in claim 5, wherein the neutralization medium comprises an ion exchanger.

8. The process as claimed in claim 1, wherein the neutralization medium comprises liquid with which the solvent is immiscible.

9. The process as claimed in claim 1, wherein the metal oxide is selected from the group consisting of oxides of the 3rd and 4th main group, transition metal oxides, and oxides of the lanthanoids and actinoids.

10. The process as claimed in claim 9, wherein the metal oxide is selected from the group consisting of $SiO_2$, $TiO_2$ and $ZnO_2$.

11. The process as claimed in claim 1, wherein the metal oxide dispersion is a colloidal dispersion.

12. The process as claimed in claim 1, wherein the solvent comprises an aromatic solvent or an ester.

13. A process for the production of a polymer material, comprising:
    i) providing a solvent-containing metal oxide dispersion,
    ii) removing basic or acidic compounds from said solvent-containing metal oxide dispersion to produce a neutralized solvent-containing metal oxide dispersion, in a process comprising:
        a) conversion of solvent to the gas phase;
        b) allowing the solvent to condense;
        c) bringing the condensed solvent of b) into contact with a neutralization medium;
        d) returning the neutralized solvent of c) to the metal oxide dispersion to produce a neutralized solvent-containing metal oxide;
    iii) using said neutralized solvent-containing metal oxide in the production of a polymer material.

14. The process of claim 13, wherein the polymer material is selected from the group consisting of polyesters, polyamides, polyimides, polycarbonates, silicones, polyethers, polyether ketones, poly(meth)acrylates, and polysulfones.

* * * * *